Jan. 13, 1942.  L. H. MORIN ET AL  2,269,880
METHOD OF CASTING THERMOPLASTIC ELEMENTS.
Filed March 18, 1937  2 Sheets-Sheet 1
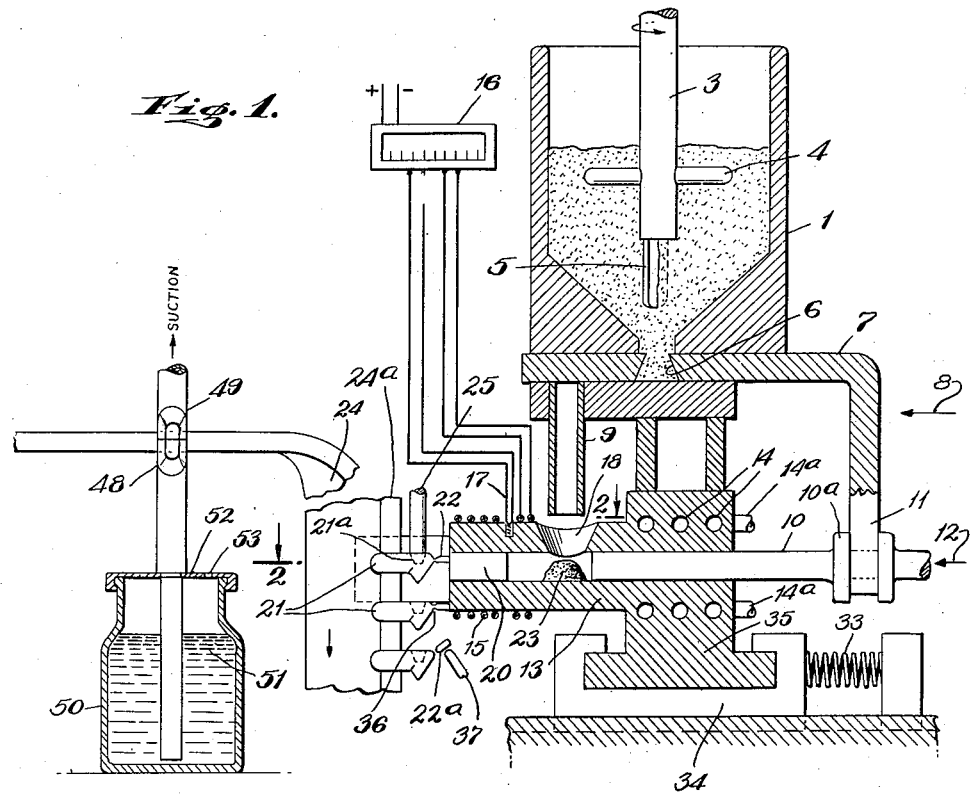
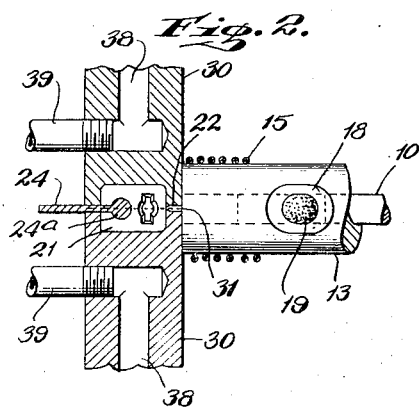
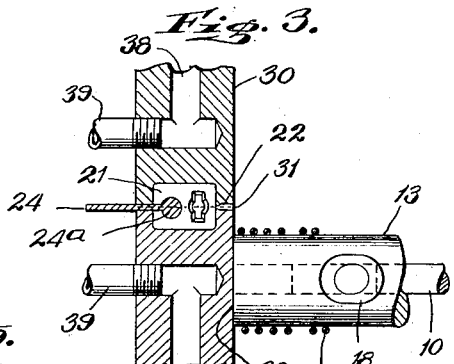
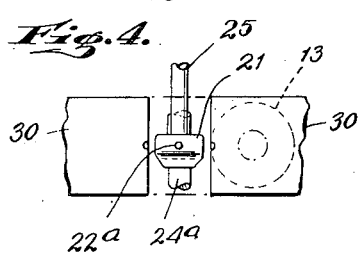
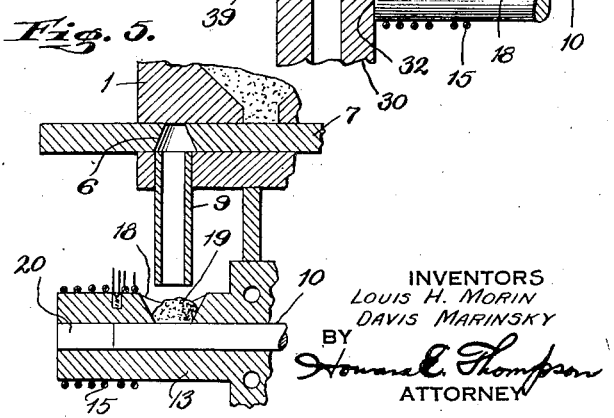
INVENTORS
LOUIS H. MORIN
DAVIS MARINSKY
BY
ATTORNEY Jan. 13, 1942. L. H. MORIN ET AL 2,269,880
METHOD OF CASTING THERMOPLASTIC ELEMENTS
Filed March 18, 1937 2 Sheets-Sheet 2
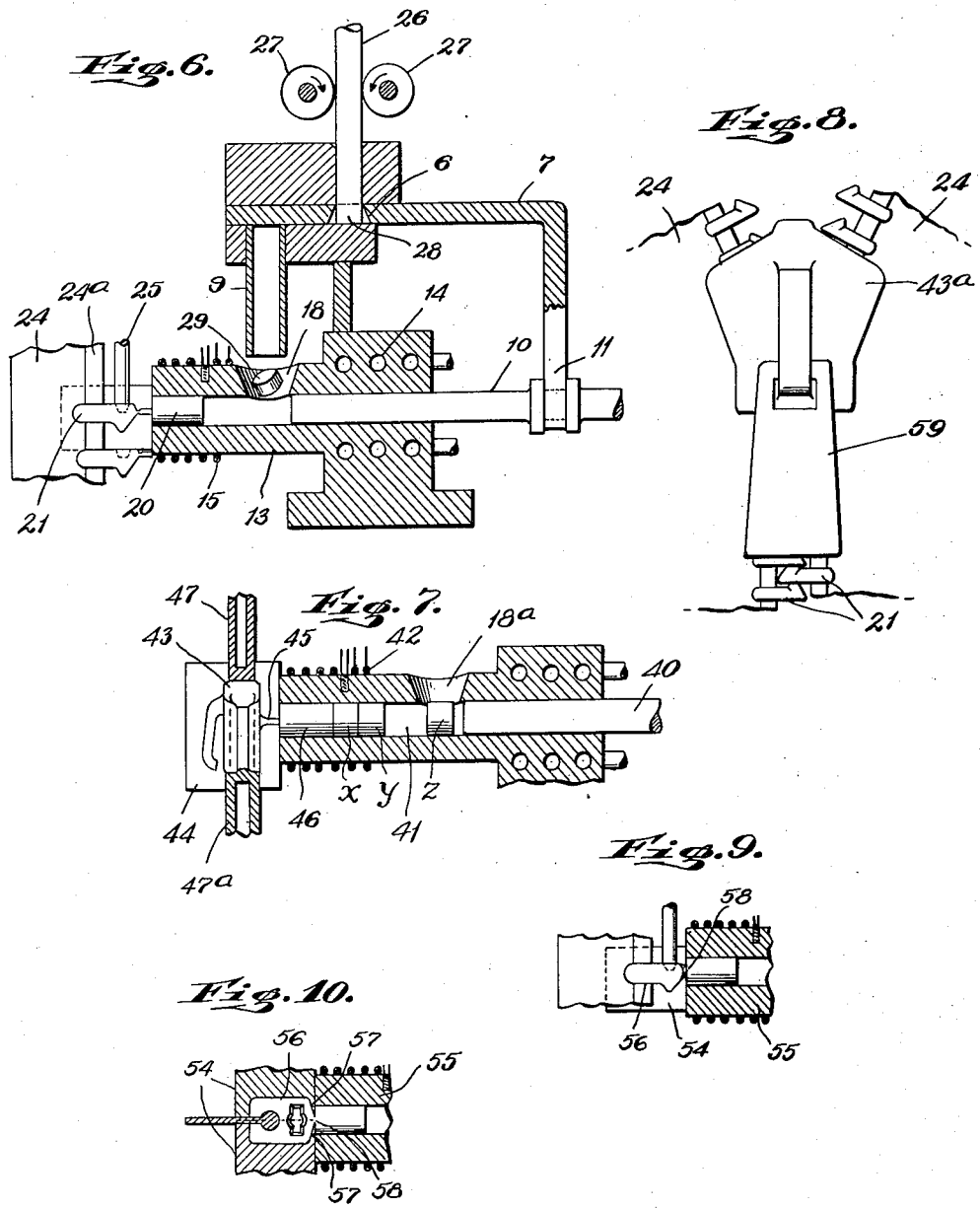
INVENTORS
LOUIS H. MORIN
DAVIS MARINSKY.
BY
Howard E. Thompson
ATTORNEY Patented Jan. 13, 1942

2,269,880

UNITED STATES PATENT OFFICE 2,269,880

METHOD OF CASTING THERMOPLASTIC ELEMENTS

Louis H. Morin and Davis Marinsky, Bronx, N. Y.

Application March 18, 1937, Serial No. 131,606

6 Claims. (Cl. 18—55)

This invention relates to the manufacture of thermoplastic elements, such for example, as the elements or parts of what are known as separable fasteners employing stringers with a slider movable along the stringers to couple and uncouple the same; and the object of the invention is to provide a method of die casting thermoplastic elements which consists in employing a small diameter cylinder with a small diameter piston operating in the cylinder to quickly and efficiently heat the casting material employed and at the same time reduce the pressure required to move the thermoplastic material in the cylinder and pressure feed it into the mold or die cavity; a further object being to provide a method of casting thermoplastic material which consists in supporting the discharge end of the cylinder in constant engagement with at least one die part of the casting and mold dies employed to prevent the discharge of the thermoplastic material from the cylinder except when in alinement with the gate orifice communicating with the impression of the die; a further object being to provide a method involving automatically actuated means for controlling the supply of the casting material to the cylinder to satisfy the requirements in the successive casting strokes of the piston or plunger; and with these and other objects in view, the invention consists in a method of casting thermoplastic elements or bodies as more fully hereinafter described and claimed.

The invention is fully disclosed in the following specification, of which the accompanying drawings form a part, in which the separate parts of our improvement are designated by suitable reference characters in each of the views, and in which:

Fig. 1 is a diagrammatic sectional view, illustrating one method of casting thermoplastic elements.

Fig. 2 is a diagrammatic sectional plan view of a part of the construction shown in Fig. 1.

Fig. 3 is a view similar to Fig. 2 with parts in a different position.

Fig. 4 is a diagrammatic face view of the die in separated position showing a casting therebetween.

Fig. 5 is a detail view of part of the construction shown in Fig. 1 with parts in a different position.

Fig. 6 is a view similar to Fig. 1 but showing only a part of the construction and showing a modification.

Fig. 7 is another view similar to Figs. 1 and 6, showing another modification with a different type of mold cavity in the die.

Fig. 8 is a detail view of a part of a separable fastener made according to the invention.

Fig. 9 is a detail view of a part of the construction shown in Fig. 1 and showing a modification; and, Fig. 10 is a sectional plan view of the structure shown in Fig. 9.

In the art of casting or molding thermoplastic material, such for example as cellulose acetate, it has been the common practice to employ a relatively large mass of the plastic casting material employed and to heat this mass in a relatively large cylinder and use a large piston for advancing the material in the cylinder, in the operation of injecting the heated material into the impression or cavity of a die or mold. This practice has been objectionable from the standpoint of efficient heating of the plastic material, as well as due to the fact that high pressure is required in injecting the material into the die or mold cavity, and these and other objectionable features to the conventional method employed are overcome in the use of a cylinder and piston of small diameters which, in addition to providing quick and efficient heating of the plastic material, also eliminates the use of excessive or high pressure in injecting the material into the mold cavity, and also permits an automatic feed of the material employed into the cylinder to compensate for the discharge of heated material therefrom.

In Figs. 1 to 5 inclusive, we have diagrammatically illustrated one adaptation and use of the method and, in these figures, we have shown at 1 a hopper-shaped container for the thermoplastic casting material to be employed, such for example as cellulose acetate, which may be in the form of small particles, or of granulated or powdered form, as is indicated at 2 in Fig. 1 of the drawings.

Arranged within the hopper is an agitator rod 3 rotated by suitable means through the drive of the machine. The rod 3 is provided with a cross bar 4 which, in conjunction with a flat lower end portion 5 on the rod, serves to agitate the material 2 in the hopper to insure proper gravity feeding of the material into the recess 6 of a delivery slide 7. With some forms of material, the agitator and its associated parts need not be employed, and with this thought in mind, the same will be made detachable with respect to the hopper and may be driven through a flexible shaft, if desired.

The slide 7 is adapted to move forwardly and backwardly with respect to the hopper 1 and, in the forward movement represented by the arrow 8, the material 2 arranged in the recess or pocket 6 of the slide will be moved into registering position with a discharge pipe or tube 9 which extends downwardly from the hopper, or the lower surface of the slide 7, as clearly seen in Fig. 1 of the drawings.

At 10, we have shown a piston or plunger, to the flanged portion 10a of which a forked end 11 of the slide 7 is coupled so that the slide moves with the piston, said piston being actuated by suitable pressure means in the direction of the arrow 12 through a spring, mechanical or other motion, or may be hydraulically or pneumatically actuated. At this time, it will be apparent that the degree of movement of the piston in the direction of the arrow 12 will govern the discharge of the material 2 into the pocket 6 in its registration with the pipe 9 or in failing to register therewith.

The piston 10 operates freely but snugly in a cylinder 13. The rear end of the cylinder is enlarged and cooled by suitable means circulated through passages 14 with which a flexible pipe 14a will be coupled. Upon the forward or discharge end of the cylinder is arranged an electric heating coil or element 15 connected to a suitable source of supply through a thermostatic controlling pyrometer 16 diagrammatically illustrated in Fig. 1 of the drawings, and at 17 we have indicated suitable pyod means also in circuit with the instrument 16, which serves to control the temperature at the heated end of the cylinder to a substantially fixed or predetermined degree.

Intermediate the end portions of the cylinder, the upper wall thereof is provided with an outwardly flared or countersunk passage 18 disposed beneath the pipe 9 and forwardly of the end of the piston 10 when at the limit of its backward movement, as seen in Fig. 1 of the drawings. From the foregoing, it will appear that when the piston 10 moves forwardly carrying with it the slide 7, the casting material will be dropped into the aperture 18, as indicated at 19 in Fig. 5 of the drawings. In this forward or feeding stroke of the piston, the heated molded material as at 20 which is now plastic will be injected under pressure into the impression or cavity of the particular dies employed. In Fig. 1 of the drawings, the cavity will be such as to form a link 21 of what is known as a separable fastener, and assuming that the cylinder 13 is in alinement with the gate orifice or passage 22 of the particular dies employed.

In the return or backward stroke of the piston from a position substantially similar to that shown in Fig. 5 or to that shown in Fig. 1, the material held in the aperture 18 as at 19 will drop into the cylinder forwardly of the piston as indicated at 23 and be advanced in the next stroke of the piston. At this time, it will be well to note that the size of the aperture 6, or the amount of molding material to be collected therein, will be so measured as to maintain a constant supply of the molding material in the cylinder or to replenish the supply thereto. The forward movement of the piston is limited by the filling of the impression or cavity in the particular dies employed, and should an excessive amount of the molding material prevail in the cylinder, the forward movement will naturally be restricted. Thus, the operation becomes automatic and substantially fool-proof.

It will be seen that the recess 6 of the delivery slide forms a reservoir and that at each reciprocation of the plunger and consequently of the slide a fixed quantity of material is separated from the supply of material in the container 1 and the reservoir with this fixed quantity of material therein is bodily moved forwardly with the feeding stroke of the plunger. In this connection the word "reciprocation" is used to refer to both the feeding and the return stroke of the plunger.

A certain amount of the material in the reservoir is then deposited in the aperture 18 and ultimately in the cylinder in front of the front end of the plunger. However, the portion of the fixed quantity which is thus deposited in the cylinder is controlled by the amount of forward movement of the plunger and consequently of the reservoir. If the plunger is prevented by an accumulation of material, in the front end of the cylinder, from moving forward beyond a certain predetermined point, then the reservoir will not come in registry with the pipe 9 and no material at all will be moved from the reservoir to the cylinder. After the situation has been corrected, either by the action of the plunger or by attention from the operator, the movement of material from the reservoir to the cylinder will be resumed. Looked at in another way, an excess of material is always supplied in the reservoir 6 and then that material is drawn on as required by the needs of the casting mechanism and is replenished during each reciprocation of the plunger.

It will also be seen that the reservoir 6 has an inlet at the top and an outlet at the bottom thereof, the inlet being open when the reservoir is in the position shown in Fig. 1, whereas when it is in the discharging position shown in Fig. 5 the inlet is closed and the outlet is open so as to discharge material from the reservoir. The inlet will of course be closed during the major portion of the feeding stroke and during the return stroke of the plunger until the reservoir is brought back to the loading position shown in Fig. 1, where it will be refilled with enough of the material to replace the quantity discharged at the discharging position.

In the structure shown in Fig. 1, the link 21 is cast around a mounting tape or stringer 24 of a separable fastener, said tape having an enlarged or beaded edge 24a on which the links are cast. With this construction, a core pin 25 is also preferably employed to form the desired recess 21a at one side of each link 21 which is cast, it being understood that the links are cast in a successive series of casting operations at predetermined longitudinally spaced intervals on the tape.

In Fig. 6 of the drawings, another method is shown for supplying the casting material to the cylinder 13, in which a rod or wire 26 of the desired molding material is employed. This wire is fed by intermittently actuated rollers or other means 27 into the recess 6 of the slide 7. The recess 6 will be of such size as to correspond with the diameter of the rod or wire employed, sufficient clearance being allowed to permit free passage of the wire into said recess. With this construction, the forward movement of the slide will cause a portion or biscuit 28 of the molding material to be sheared from the rod 26 and carried into position to drop through the feed tube or discharge pipe 9 as indicated at 29 in Fig. 6 and to drop into the recess or passage 18 of the cylinder so that in the backward movement of the piston 10, the material or biscuit contained in the recess 18 will drop into the cylinder 13 forwardly of the piston, and the operation of the structure shown in Fig. 6 will otherwise be the same as that shown in Figs. 1 to 5 inclusive. If an excessive amount of the material should collect in the cylinder, the biscuit 28 will not be permitted to drop through the tube 9 until a sufficient advance stroke of the piston brings the aperture 6 in registering alinement with said tube.

Thermoplastic molding compounds of the kind under consideration which are reduced to plastic state by exposure to heat, have the property of swelling or growing due to released gases, somewhat in the manner of the action of bread dough by reason of the yeast employed. It will therefore appear that the material 20 in the forward end of the cylinder 13 would have a tendency to discharge through the open end thereof during the interval between successive injecting operations. This condition is overcome as will appear from the following statement.

In the drawings, 30 represents the relatively movable dies or die parts, the parting line of which is shown at 31. At 32, we have shown the forward end of the cylinder 13 engaging the surface of the dies. In Fig. 2 of the drawings, the cylinder is shown in registering alinement with the aperture 22, whereas in Fig. 3 of the drawings, the cylinder has been moved to one side of the parting line 31, in which operation the material 20 is sheared from the cast material prevailing in the aperture 22 and is held in contant engagement with the surface of the die by the spring 33 illustrated in Fig. 1 of the drawings. This spring acts upon a gib 34 in which the flange body or slide 35 of the cylinder 13 is mounted to provide for the lateral shifting movement illustrated in Figs. 2 and 3 of the drawings. Suitable means will be provided, such for example as cams, for imparting movement to the cylinder at the properly timed intervals in the cycle of operation of the machine, which is only diagrammatically illustrated. The spring 33 acts upon the cylinder primarily when the cylinder is in the position to inject the casting material into the die impression, and suitable means will be provided to relieve the pressure of the spring upon the cylinder during the movement over the surface of the dies to eliminate unnecessary wear. A slight clearance is provided for this purpose, but this clearance will not be sufficient to permit the discharge of the material 20 from the cylinder.

During the cycle of operation, the dies 30 are separated and the cast link 21 is removed from the mold cavities in each die part and remains on the core 25. The cast link is then fed into a position to properly space the successive links on the stringer tape and the cast links are stripped from the core 25, the dies again closed and the cycle of operation repeated. The lower surfaces of the dies may be used as the stripping agent by partially closing the dies, and also as the means for spacing the links, as above described. As the cast links are fed downwardly, the gates 22a which join the link proper 21 in a weakened portion as indicated at 36 may be removed with a knock-off rod or other device 37 as clearly illustrated in Fig. 1 of the drawings. The dies 30 are cooled by the circulation of water or other chilling means through passages 38 formed in said dies and extending into positions adjacent the impressions on the parting line 31 of the dies as illustrated in Figs. 2 and 3 of the drawings. The water or other cooling medium is discharged adjacent the parting line of the dies through pipes 39.

In Fig. 7 of the drawings, we have diagrammatically illustrated a part of the cylinder structure shown in Fig. 1 to illustrate a modified method of procedure involving what may be termed a multiple charge for the cylinder in each casting operation. The object of this arrangement is to facilitate the use of a relatively small piston 40 in a cylinder 41 of small diameter heated as indicated at 42 in a manner similar to the heating shown in Fig. 1 of the drawings, in the operation of forming relatively large die castings 43, such for example as a slider for separable fasteners within and between relatively movable dies 44 similar to the dies 30, except as to size and contour of the impression or cavity formed between the parting line of the dies. In Fig. 7 of the drawings, 45 represents the gate aperture through which the heated material 46 may be injected into the impression in forming the casting 43.

With the above method briefly described and illustrated in Fig. 7 of the drawings, the piston 40 is given a successive series of strokes in each shot or casting operation of the machine. The cylinder 41 is supported in a position at one side of the aperture 45 during these successive strokes, except for the last stroke, which becomes the casting or shot stroke which injects or pressure feeds the material 46 into the die cavity. In the drawings, we have indicated at $x$ what will be regarded as the first charge and at $y$ the second charge, both being introduced into the cylinder through the opening 18a similar to the opening 18 and by means similar to that shown in Figs. 1 or 6 of the drawings.

At $z$ is shown a third or last charge which when advanced will force the material 46 into the die. At this time, the cylinder has been brought into properly registering position with the aperture 45. It is a well known fact that thermoplastic molding compounds are poor conductors of heat, and consequently it is desirable to keep the diameter of the cylinder at a minimum so as to effect quick heat transfer to the center of the mass of the molding material employed. Thus, by providing the intermittent multiple charges above described, the necessary volume to fill the casting is replenished in the cylinder and the time element required to reduce the molding material to plastic or moldable condition is compensated for. The small diameter cylinder also brings the center of the material being heated nearer to the heating element employed and will not necessitate the use of excessive heating agents which might cause the material to oxidize on the cylinder wall.

From the foregoing illustration, it will appear that each charge, $x$, $y$, $z$, contains much less material than the amount needed for the desired casting. In this illustration, it will also be apparent that the charges $x$ and $y$ are forced into the cylinder under pressure by the piston or plunger 40 when the discharge end of the cylinder is sealed by the die, for example as illustrated in Fig. 3, and that when the charge $z$ is moved forwardly in the cylinder, the impression of the die will be exposed to the discharge end of the cylinder and the heated material injected into the impression. In initially starting the machine, it will be understood that a few charges will be introduced into the cylinder and heated to the desired degree in order to provide the necessary reserve amount in the cylinder beyond the amount required for successive castings. It is desirable that the successive charges, for example $x$, $y$, $z$, be equivalent to the amount required for making each casting so that after the initial charging of the cylinder, the amount discharged in an injection stroke in making a casting will be replaced by the charges $x$, $y$, $z$. In this operation it will also be apparent that by the time the charge $z$ is introduced into the cylinder, the charge $x$ will be completely melted; and the charge $y$ substantially entirely melted. It will also appear that after the injection stroke, the first charge $y$ will become fully melted and remain in the cylinder; and the charge $z$ will become substantially melted so that the next following series of charges will be melted in the same fashion and cycle. The direct and firm contact of successive charges with each other, and by reason of the heat flow from the melted material of one charge to that of an adjacent charge, provides the quick melting of each successive charge.

In addition to the foregoing advantages, by utilizing a cylinder of small diameter, the required pressure for actuating the piston is materially reduced and eliminates the necessity of utilizing excessive pressures heretofore found to be essential in die casting material of the class under consideration.

From the standpoint of heat transfer, by introducing a successive series of small doses or charges into the cylinder, a heat flow is provided not only through the cylinder walls but also through adjacent surfaces of the respective charges, and less chilling effect takes place upon the cylinder than would be the case if a large volume of material was introduced into the cylinder in one charge.

The above described intermittent or successive charges $x$ and $y$ make take place in the cycles of operation of the machine during which the dies are open and the casting discharged from the die parts 44 or from hollow core pins 47, 47a, or from any other type of core pins which may be used in the formation of different castings, depending entirely upon the structure of the casting or the manner of producing the same. While the invention has been described as applicable to the casting of separable fastener devices, the same may be used in forming other types of devices of this kind. By providing hollow cores 47, 47a, a fluid may be circulated therethrough for cooling the same.

From the foregoing, it will be apparent that at all times an excessive amount of molding material 20 will prevail in the cylinder after a casting operation, not only to maintain the discharge end of the cylinder sealed, but also to facilitate more efficient heat transfer of the added charge or charges into the cylinder in the successive cycles of operation. Also, as before stated, if an excessive amount of material is built up in the cylinder, this will be automatically compensated for and checked by the feed control governed by the length of stroke of the piston and the registration of the aperture 6 with the tube 9. The time period from the pressure feeding or injection of the molding material from the cylinder into the die and the replacement or replenishment of the casting material into the cylinder, in addition to allowing sufficient time for heating the material, also provides for a relatively long period of time for chilling or setting the casting material in the die impression between the various steps in the cycle of operation illustrated in Figs. 2 and 3 to the step illustrated in Fig. 4, and then back to the position shown in Fig. 2. In making castings such as the links 21, these castings may be made at the rate of one hundred and fifty or more per minute. Notwithstanding this speed of operation, ample time is provided for the performance of the several functions above described. Of course, in casting larger bodies where greater time is required for heating the material and for chilling the resulting casting formed in the dies, a lower production per minute will result.

In Fig. 1 of the drawings, we have also diagrammatically illustrated means for treating the tape 24 prior to the casting of the links 21 thereon, which consists in feeding the tape 24 between adjacent nozzle ends 48, 49 of supply pipes and suction pipes respectively. The supply pipe 48 extends from a container 50 for an acetone or other solvent or cement 51 which is adapted to be drawn by suction which may prevail in the nozzle 49 from a suitable source of generation, not shown. In this way, the tape 24, or at least the beaded edge portion 24a may be saturated with the solvent or cement to aid in securing the links thereon. In pressure casting the links on the tape 24, the casting material will extend into the interstices of the braid to securely fix the links thereon. The container 50 will preferably be provided with a cap or cover 52 having a small vent opening 53 to permit the discharge of the material 51 from said container. This construction is especially desirable when acetone is used.

In Figs. 9 and 10 of the drawings, we have shown a slight modification which consists in eliminating from the dies 54 employed the gate passage or opening as at 22 in Fig. 1 of the drawings, and in bringing the cylinder 55 in direct registration with the impression 56 in the dies 54. With this construction, it will be desirable to taper the walls 57 of the impression 56 in the manner illustrated in Fig. 10 so as to reduce the contact or exposure to the cylinder 55 to a small opening or section 58. In the sliding movement of the cylinder with respect to the dies 54, a clean shearing operation will be performed—thus eliminating the necessity of removing the gate as at 22a in Fig. 1 of the drawings. This arrangement may be applicable to many types of castings, especially where the contour of the casting to be performed will permit this arrangement.

In Fig. 8 of the drawings, we have indicated a part of two stringer tapes 24 joined by a slider 43a, such for example as a slider fashioned from the dies 44 as in Fig. 7 of the drawings. At 59, we have indicated a finger piece or pull attached to the slider to move the same longitudinally of the stringers. The coupling links of the stringers are indicated at 21.

With the different types of castings to be formed in accordance with the method, multi-color effects may be produced in the castings by simply inserting a mixture of several colors of the thermoplastic material in the hopper, and if desired, the ground color of the resulting castings may be controlled by incorporating a greater amount of one base color, and it may also be desirable to incorporate larger particles of the colors which are to appear on and over the surface of the ground color. Certain effects of this type may also be accomplished by the intermittent charging of the cylinder as at $x$, $y$ and $z$ in Fig. 7 of the drawings with distinct colors or with predetermined combinations of colors in each charge.

In making individual castings, such for example as in casting the sliders as in Fig. 7 of the drawings, these castings when discharged from the core pins or from the dies may simply be dropped into a tank or container of a chilled fluid such as cold water, and if desired, an air blast may be used to direct the passage or discharge of the casting when stripped from the core by any suitable means. By cooling the inner end of the cylinder, the piston or plunger when in its normal or retracted position is kept cool by the chilling action of said end of the cylinder, thus keeping the piston clean and unobstructed.

Having fully described our invention, what we claim as new and desire to secure by Letters Patent, is:

1. The method of forming die castings of thermoplastic material which comprises reciprocating a plunger in a cylinder to feed successive charges of material into a die cavity, separating a fixed quantity of said material from a supply thereof and placing it in a reservoir having an inlet and an outlet, then on the feed stroke of the plunger closing said inlet, and opening said outlet an amount determined by the extent of said feed stroke, discharging material through said outlet into said cylinder, and upon the return stroke of the plunger closing said outlet and opening said inlet and introducing material through said inlet into the reservoir from said supply.

2. The method of forming die castings of thermoplastic material which comprises reciprocating a plunger in a cylinder to feed successive charges of material into a die cavity, separating a fixed quantity of said material from a supply thereof and placing it in a reservoir having an inlet and an outlet, then on the feed stroke of the plunger closing said inlet, and opening said outlet an amount determined by the extent of said feed stroke, discharging material through said outlet and depositing it in a position adjacent said cylinder and rearwardly of the front end of the plunger at the termination of a normal feed stroke, retracting the plunger, and moving said deposited material into the cylinder in front of said front end of the plunger and upon said retraction closing said outlet and opening said inlet and introducing material through said inlet into the reservoir from said supply.

3. The method of forming die castings of thermoplastic material which comprises reciprocating a plunger in a cylinder to feed successive charges of material into a die cavity, separating a fixed quantity of said material from a supply thereof and placing it in a reservoir having an inlet and an outlet, then on the feed stroke of the plunger closing said inlet, and opening said outlet an amount determined by the extent of said feed stroke, discharging material through said outlet into said cylinder, and upon the return stroke of the plunger closing said outlet and opening said inlet and introducing material through the inlet into the reservoir from said supply, and maintaining said outlet closed when the forward end of the plunger fails to pass a predetermined point on its feed stroke.

4. The method of forming die castings of thermoplastic material which comprises reciprocating a plunger in a cylinder to feed successive charges of material into a die cavity, separating a fixed quantity of said material from a supply thereof and placing it in a reservoir having an inlet and an outlet, then on the feed stroke of the plunger closing said inlet, and opening said outlet an amount determined by the extent of said feed stroke, discharging material through said outlet and depositing it in a position adjacent said cylinder and rearwardly of the front end of the plunger at the termination of a normal feed stroke, retracting the plunger, moving said deposited material into the cylinder in front of said front end of the plunger, and upon said retraction closing said outlet and opening said inlet and introducing material through said inlet into the reservoir from said supply, and maintaining said outlet closed when the forward end of the plunger fails to pass a predetermined point on its feed stroke.

5. The method of forming die castings of thermoplastic material which comprises reciprocating a plunger in a cylinder to feed successive charges of material into a die cavity, separating from a supply of material a quantity thereof in excess of the amount required to fill said cavity, placing said quantity in a reservoir of a size to hold only that quantity, and which reservoir has an inlet and an outlet, then on the feed stroke of the plunger closing said inlet, and opening said outlet an amount determined by the extent of said feed stroke, discharging material through said outlet into said cylinder, and upon the return stroke of the plunger closing said outlet and opening said inlet and introducing enough material through said inlet into the reservoir, from said supply, to refill the reservoir.

6. The method of forming die castings of thermoplastic material which comprises reciprocating a plunger in a cylinder to feed successive charges of material into a die cavity, separating from a supply of material a quantity thereof in excess of the amount required to fill said cavity, placing said quantity in a reservoir of a size to hold only that quantity, then on the feed stroke of the plunger closing the reservoir and moving it to a discharging position, at that position discharging from the reservoir to the cylinder an amount of material substantially equal to that fed into the cavity by that feed stroke, then on the return stroke of the plunger again closing the reservoir and returning it to initial position, and there opening it and refilling it.

LOUIS H. MORIN.
DAVIS MARINSKY.